United States Patent [19]
Musschoot

[11] 3,789,977
[45] Feb. 5, 1974

[54] VIBRATORY VERTICAL LIFT CONVEYOR
[75] Inventor: Albert Musschoot, Barrington, Ill.
[73] Assignee: General Kinematics Corporation, Barrington, Ill.
[22] Filed: Jan. 14, 1972
[21] Appl. No.: 217,891

[52] U.S. Cl. .................................. 198/220 BC
[51] Int. Cl. .................................... B65g 27/00
[58] Field of Search ................................ 198/220

[56] References Cited
UNITED STATES PATENTS
| | | | |
|---|---|---|---|
| 3,432,079 | 3/1969 | Williams | 198/220 DC |
| 3,135,429 | 6/1964 | Anderson | 198/220 BC |
| 2,877,890 | 7/1955 | Carrier | 198/220 BC |

Primary Examiner—Richard E. Aegerter
Attorney, Agent, or Firm—Axel A. Hofgren et al.

[57] ABSTRACT

A vibratory vertical lift conveyor of the type employing a spiral ramp. The conveyor, in addition to the spiral ramp, includes a base vertically spaced therefrom, which base mounts a vibratory force imparting device which applies a generally vertically directed force to the ramp. The ramp is further connected to the base by means of elongated links, each of which is pivotally connected to the ramp at one end and pivotally connected to the base at the other. Each link is angularly disposed in a direction non-parallel to the direction of force application to the ramp.

4 Claims, 3 Drawing Figures

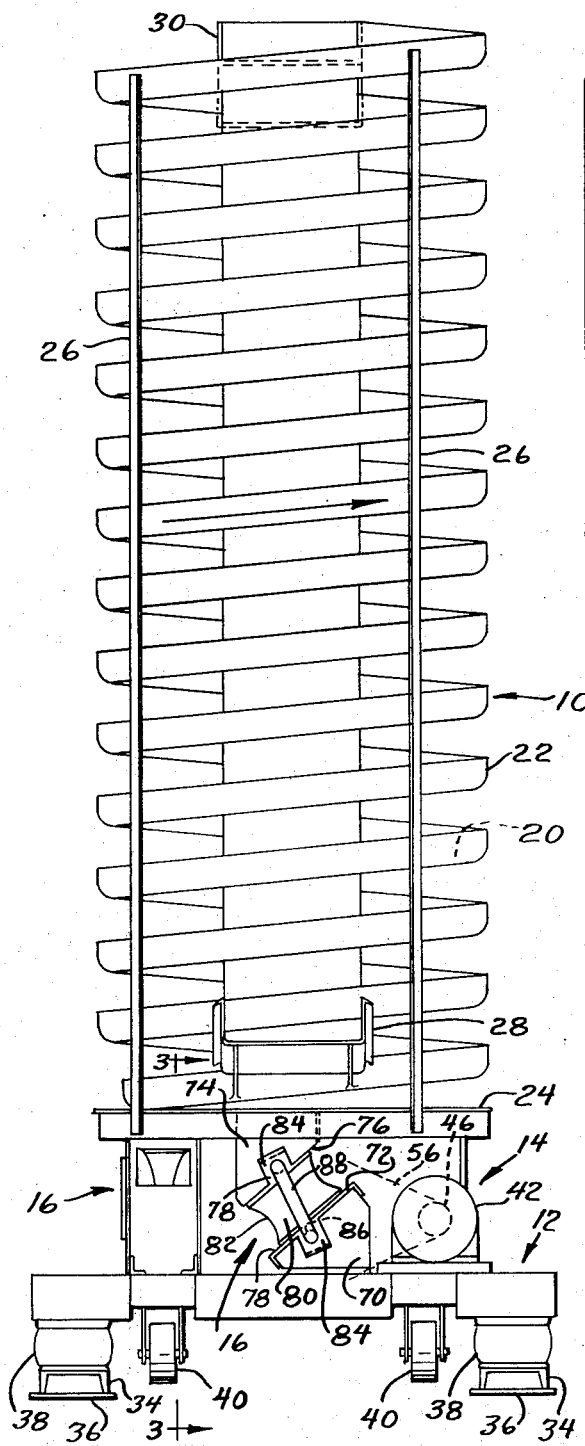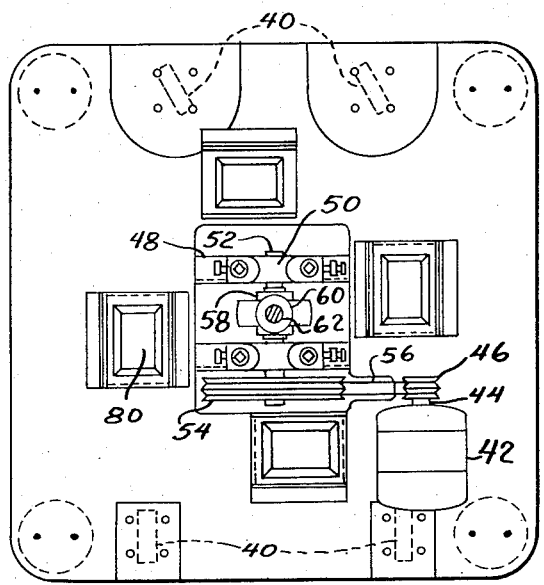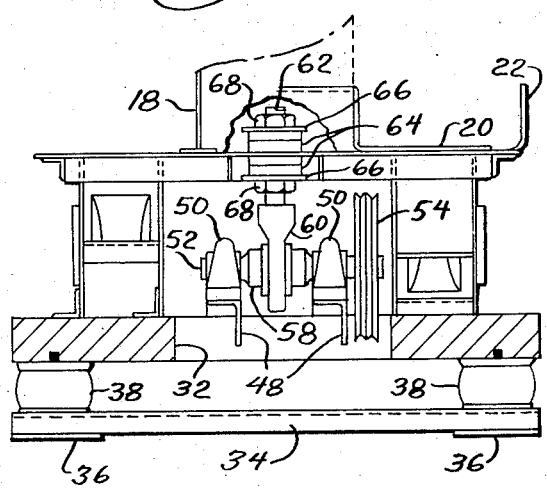

VIBRATORY VERTICAL LIFT CONVEYOR

BACKGROUND OF THE INVENTION

This invention relates to vibratory conveyors, and more specifically to vibratory conveyors employed to vertically lift materials or articles and utilizing a spiral ramp.

Recent years have seen an upsurge in the use of vibratory conveyors in many areas because of their ability to handle relatively fragile material or articles, operate with lesser energy costs than other forms of conveyor, and their relatively maintenance-free mode of operation.

One type of vibratory conveyor frequently used in vertically lifting fragile materials or articles is one employing a spiral ramp having a similarly configured conveying surface.

Such conveyors include a base which may be either above or below the ramp and which is secured to the ramp by tuned springs. On the base is a vibratory mechanism which vibrates at a frequency such that, by reason of the tuning of the springs, the ramp is vibrated in an arcuate path with a certain amount of vertical movement as well.

One principal difficulty with such conveyors is the requirement that the springs be especially fabricated so that the requisite vibratory motion will be conveyed to the ramp therethrough. This process in and of itself can be quite expensive. Moreover, the tuning of the springs prior to use often presents a time-consuming and expensive set-up problem.

SUMMARY OF THE INVENTION

It is the principal object of the invention to provide a new and improved vertical lift vibratory conveyor of the type employing a spiral ramp. More particularly, it is the object of the invention to provide such a conveyor wherein the ramp is positively vibrated by a direct connection from a vibratory force imparting means and wherein a unique connection for guiding the ramp through the desired arcuate and vertical path of movement is established between the ramp and a base on which the vibratory force imparting device may be mounted.

The exemplary embodiment of the invention achieves the foregoing objects by means of a construction including a base which may be either above or below a spiral ramp having side walls for confining the articles to be conveyed by the ramp to an intermediate spiralled conveying surface. The vibratory force imparting device is mounted on the base and includes a rotary motor coupled to an eccentric which in turn drives a connecting rod in a generally vertical direction.

The connecting rod has one end connected by means of a resilient connection to the ramp to apply a vibratory force to the latter in a generally vertical direction.

A further interconnection between the base and the ramp is established by a plurality of links, each having one end pivotally connected to the ramp and its opposite end pivotally connected to the base. The arrangment is such that the links are angularly disposed in a direction nonparallel to the direction of force application to the ramp. The links are further arranged about the periphery of the base so that when an upward force is applied to the ramp by the vibratory force imparting device, the links require the ramp to move in a vertical direction while further causing the same to rotate about its elongated axis to guide the same through the requisite arcuate movement as well.

Additionally, resilient means may be interposed between the ramp and the base, again at angles nonparallel to the direction of force application.

If the construction is such that the base is located below the ramp, the former may be provided with casters such that the entire assemblage is portable.

Other objects and advantages will become apparent from the following specification taken in conjunction with the accompanying drawings.

DESCRIPTION OF THE DRAWINGS

FIG. 1 is a side elevation of a vibratory lift conveyor made according to the invention;

FIG. 2 is a generally horizontal section of the base of the conveyor; and

FIG. 3 is a vertical section taken approximately along the line 3—3 of FIG. 1.

DESCRIPTION OF THE PREFERRED EMBODIMENT

An exemplary embodiment of a vibratory vertical lift conveyor made according to the invention is illustrated in FIG. 1 and is seen to be comprised of four basic sections. The first includes an upwardly spiralled ramp, generally designated 10, while the second basic component is a base, generally designated 12 which, as shown, is below the ramp 10 and vertically spaced therefrom. However, it is to be understood that the principles of the invention could still be employed with success were the base 12 to be vertically spaced above the upper extremity of the ramp 10.

The third basic component is a vibratory force imparting means, generally designated 14, mounted on the base 12 and, as will be seen, connected to the ramp 10 to impart a generally vertically directed force thereto.

The fourth and last major component includes a plurality of connecting means, each generally designated 16, interconnecting the base 12 and the ramp 10.

As best demonstrated in FIGS. 1 and 3, the ramp 10 is defined by a central tubular support column 18 about which is a spirally configured, upwardly progressing conveying surface 20. About the periphery of the conveying surface 20 is an upstanding side wall 22 which, together with the tube 18, insure that material being conveyed upwardly on the conveying surface 20 will be retained thereon.

A ramp base 24 formed of angle iron or the like is located at the lower extremity of the ramp 10, and extending upwardly therefrom may be a plurality of braces 26 secured to each of the flights of the ramp 10 in any suitable manner, as by welding. Adjacent the lower end of the ramp 10 is an inlet chute 28 onto which may be dropped articles or materials to be conveyed upwardly by the conveyor. A similar chute 30 is provided at the upper extremity of the ramp 10 and extends outwardly of the outermost extremity of the ramp 10 to direct material or articles being conveyed by the conveyor to a desired point of further use or processing.

The base 12 may be formed of any suitable material, is generally rectangular in shape, and includes a central cut-out 32. Along two sides of the base 12, there is located an elongated, inverted channel 34 each mounting, at its respective ends, floor surface engaging pads 26. By any suitable means, the webs of the channels 34 are connected to respective, inflatable balloon-like structures 38 which in turn are connected to the base 12 by any suitable means.

Inboard of each of the channels 34 are four casters 40, one pair of which may be pivoted. The arrangement is such that when the balloon-like structures 38 are inflated, the casters 40 will not engage the underlying surface, but when the balloon-like structures are deflated, the casters 40 will engage the underlying surface so that the entire conveyor may be easily pushed from one location to another as needs may require.

The vibration imparting means 14 consists of an electrical motor 42 suitably secured to the base 12 and having a rotary output shaft 44 mounting at least one drive sheave 46. A pair of angle irons 48 are secured to the base 12 by any suitable means so as to extend across the cut-out 32 and mount a pair of pillow block bearings 50. The bearings 50 journal a shaft 52 which in turn mounts at one end at least one sheave 54. A belt 56 is trained about the sheaves 46 and 54 so that energization of the motor 42 will result in the rotation of the shaft 52.

That portion of the shaft 52 in between the pillow block bearings 50 includes an eccentric 58 journalled in one end of a connecting rod 60. The opposite end of the connecting rod 60 is threaded as at 62 and extends through an opening (not shown) in the ramp base 24. Impaled on the threaded end of the connecting rod 60 in sandwiching relation about its point of passage through the opening in the ramp base 24 are resilient washers 64 or the like. The resilient washers 64 are in turn sandwiched by metal washers 66 and finally by nuts 68. The arrangement is such as to define a resilient connection between the connecting rods 60 and the ramp 10 for the purpose of minimizing the load on the force imparting device 14 during start-up. That is, when it is desired to initiate operation of the conveyor and the ramp 10 is at rest, some flexibility in the connection is provided so that the motor 42 will not be forced to drive the ramp 10 to its full range of vertical movement immediately upon energization.

The connecting elements 16 will now be described in conjunction with the three Figs. of drawings. In particular, four connecting means 16 are provided and are located at about ninety degree increments about the center of the base. Since each is identical, only one will be described.

With reference to FIG. 1 particularly, a block 70 having an angled upper surface 72 is secured to the base 12 in any suitable manner. A similar block 74 having a complementary angled surface 76 is secured to the underside of the ramp base 24 and is horizontally displaced somewhat from the lower block 70 as illustrated in FIG. 1. The arrangement is such that the angled surfaces 72 and 76 are approximately parallel. Moreover, the angle of the two surfaces 72 and 76 is chosen to be nonparallel to the direction of force application from the force imparting means to the ramp 10.

Both of the surfaces 72 and 76 are provided with sheet metal caps 78 and interposed between the two caps 78 is a resilient element 80 formed of rubber or the like. According to the preferred embodiment, each resilient element has a rectangular cross section at any point along its length, which cross sectional dimension will vary inasmuch as the four side walls thereof are concave as generally indicated at 82. The resilient elements may be formed of rubber or the like and are secured to the caps 78 in any suitable manner.

Each of the caps 78, on its outboard side, includes a journal tab 84 abutting the outboard side of the corresponding one of the blocks 70 and 72. Each journal tab includes a generally circular opening 86 for pivotally receiving inturned ends of elongated links 88. That is, the upper end of each link 88 is pivotally received in the journal tab 84 of the cap 78 associated with the block 74, while the lower end of each link 88 will be pivotally received in the journal tab 84 associated with the block 70.

The location of the upper and lower journal tabs 80 and 84 is such that each associated link 88 will normally be disposed in a direction nonparallel to the direction of force application to the ramp 10 by the vibration imparting means 14. Moreover, the angle of disposition of each link in each of the connecting means 16 is substantially the same as the angle of disposition of each other link 88. Stated another way, if a developed view of the four connecting means 16 were to be taken, each of the four links 88 would appear to be parallel in such a view.

The links 88, by reason of their circumferential spacing about the base 12, serve to cause the ramp 10 to go through a path of movement that is both arcuate in nature and vertical as well. That is, they serve to convert the purely vertically applied force from the force imparting means 14 to a vertical and arcuate movement of the ramp 10 so as to cause the latter to pass through a path of movement requisite for conveying about the spiralled ramp. As a result, it will be appreciated that a vertical lift conveyor made according to the invention can be fabricated economically without the need for tuned springs and moveover, poses no need for elaborate adjustment procedures once assembled and yet retains all of the advantages attendant to the use of vibratory conveyors.

I claim:

1. A vibratory vertical lift conveyor comprising:
a base;
a spiralled conveying ramp vertically spaced from said base, said ramp including a conveying surface bounded by means defining side walls therefor to preclude material being conveyed upwardly on said ramp from falling off said conveying surface;
means mounted on said base including a motor and connected to said ramp for imparting a vibratory force to said ramp generally along the elongated axis thereof;
a plurality of links, each pivotally connected to said base and to said ramp, each said link being normally disposed between said base and said ramp at an angle nonparallel to the direction of application of said vibratory force to said ramp, the angle of disposition of each link being substantially the same at the angle of disposition of each other link; and
a plurality of elongated resilient elements interposed between and interconnecting said ramp and said base at circumferentially spaced locations and at an angle non-parallel and non-transverse to said direction of vibratory force application to mount said ramp on said base.

2. The vibratory conveyor of claim 1 wherein said vibration imparting means includes a connecting rod having an end secured by a resilient connection to said ramp.

3. A vibratory conveyor according to claim 1 wherein said links interconnect said base and said ramp substantially adjacent to the point of interposition of a corresponding one of said resilient elements between said ramp and said base.

4. A vibratory vertical lift conveyor comprising:
a base;
wheel means on said base and extending downwardly therefrom;
inflatable means on said base and extending downwardly therefrom, said inflatable means being constructed and arranged so that when inflated said wheels are elevated out of contact with an underlying surface, and when deflated, said wheel means will contact an underlying surface;
a spiralled conveying ramp vertically spaced above said base, said ramp including a conveying surface bounded by means defining side walls therefor to preclude material being conveyed upwardly on said ramp from falling off said conveying surface;
means mounted on said base including a motor and connected to said ramp for imparting a generally vibratory force to said ramp generally along the elongated axis thereof and including a connecting rod having an end secured by a resilient connection to said ramp;
a plurality of elongated, rigid links circumferentially spaced about said ramp, each pivotally connected to said base and to said ramp, each said link being normally disposed between said base and said ramp at an angle nonparallel to the direction of application of said vibratory force to said ramp, the angle of disposition of each link being substantially the same at the angle of disposition of each other link; and
a plurality of resilient elements interposed between and connected to both said ramp and said base at an angle nonparallel to said direction of vibratory force application and being circumferentially spaced about said ramp.

* * * * *